US006437413B1

(12) United States Patent
Yamaguchi et al.

(10) Patent No.: US 6,437,413 B1
(45) Date of Patent: Aug. 20, 2002

(54) CRYSTAL LATTICE QUANTUM COMPUTER

(75) Inventors: Fumiko Yamaguchi, Palo Alto; Yoshihisa Yamamoto, Stanford, both of CA (US)

(73) Assignee: The Board of Trustees of the Leland Standford Junior University, Stanford, CA (US)

( * ) Notice: Subject to any disclaimer, the term of this patent is extended or adjusted under 35 U.S.C. 154(b) by 0 days.

(21) Appl. No.: 09/437,877

(22) Filed: Nov. 10, 1999

Related U.S. Application Data
(60) Provisional application No. 60/107,762, filed on Nov. 10, 1998.

(51) Int. Cl.[7] .............................................. H01L 29/82
(52) U.S. Cl. ........................ 257/421; 257/14; 257/22; 324/300
(58) Field of Search ........................... 257/14, 22, 421; 324/300

(56) References Cited

U.S. PATENT DOCUMENTS

| | | | | |
|---|---|---|---|---|
| 5,917,322 A | * | 6/1999 | Gershenfeld | ................ 324/307 |
| 5,940,193 A | * | 8/1999 | Hotaling | ...................... 359/11 |

OTHER PUBLICATIONS

Chuang et al., "Bulk Spin Quantum Computation . . . " *ISSCC* 98/Session 6 TP 6.6, Feb. 5, 1998.*
Hey "Quantum Computing . . . " pp. 105–112 *Computing & Control Engineering Jrnl*, Jun. 1999.*
Sanders et al, "An Optically Driven Quantum . . . "57#Device Res. Conf. Dig, Jun. 1999.*
Tsai et al, "The First Solid State Qubit" 58th *Device Res. Conf. Dig.*, Jun. 2000.*
Heer, et al., "Neutron Spectroscopy in the Cerium Monopnictides," J Phys. C Solid State Phys. 12, pp. 5207–5219, 1979.

Koghi, et al., "Neutron Scattering from Low–Carrier–Density Strongly Correlated Electron System," Physica 213 & 214, pp. 110–115, 1995.
Haga, et al., "De Haas–Van Alphen Effect in CeP," Physicva B 206 & 207, pp. 792–794, 1995.
Kwon, "Low Energy Excitations in Dense Kondo States for Rare Earth Monopnictides," Chapter 2, Sample Preparation, pp. 40–67.
Kwon, et al., "Kondo Behavior in an Extremely Low Carrier Concentration System: CeP," Physica B, pp. 324–328, 1991.
Takeuchi, et al., "Magnetoelastic Properties of CeP Studied by Thermal Expension and Magnetostriction," J. Phys. Soc. Jpn. , 67, pp. 2094–2101, 1998.
David P. DiVincenzo; "Two–bit gates universal for quantum computation;" Physical Review A, vol. 51, No. 2, Feb. 1995.
D.P. Burum and W. K. Rhim; "Analysis of multiple pulse NMR in solids. III;" J. Chem. Phys. 71 (2), Jul. 15, 1979.

* cited by examiner

*Primary Examiner*—Jerome Jackson, Jr.
(74) *Attorney, Agent, or Firm*—Lumen Intellectual Property Services, Inc.

(57) ABSTRACT

A quantum computer comprises a crystal lattice having storage atoms. The storage atoms have nuclear storage spins, and quantum bits are stored as orientations of the storage spins. A magnetic field is applied to the crystal, the magnetic field having a gradient on the order of $1T/\mu m$. The gradient is generated by a micromagnet. The electrons of the crystal acquire a regular order, and the storage spins are initialized by inducing combined electron-nucleus transitions in the crystal, thereby transferring the electronic order to the storage spins. The storage spins are decoupled from each other by a decoupling magnetic field. Quantum logic operations are performed on the storage spins. Certain quantum logic operations require a modification of the decoupling field to recouple a plurality of the storage spins. Final polarizations of the storage spins are measured.

19 Claims, 6 Drawing Sheets

CRYSTAL LATTICE QUANTUM COMPUTER

CROSS-REFERENCE TO RELATED APPLICATION

This application is based on Provisional application No. 60/107,762 filed Nov. 10, 1998 which is herein incorporated by reference.

FIELD OF THE INVENTION

This invention pertains generally to quantum computers, and in particular to a solid state quantum computer comprising a crystal lattice.

BACKGROUND

A quantum computer is a machine that prepares a quantum mechanical system in an initial input state, performs unitary logic operations on the system, and measures a resulting output state. The superposition principle of quantum mechanics and the quantum interference induced by a projective measurement bring about "quantum parallelism," by which certain problems can be computed faster than by any classical computer.

Several physical systems are known to provide the quantum mechanical states that carry quantum bit, or "qubit," information. Each of these systems carries its own disadvantages. (i) Cold trapped ions, cavity quantum electrodynamics, and combinations of the two systems allow computation and final readout to be performed on individual qubits. However, these techniques require immense experimental exertion. (ii) Single photon gates, compatible with quantum communication links, are possible only in the presence of large optical nonlinearity with negligible loss. (iii) Systems of nuclear spins in solution molecules are based on natural and simple chemical structures and well-established techniques of pulsed nuclear magnetic resonance. However, such systems demand a large number of molecules to detect the output signals from slight population differences between nuclei with up spins and those with down spins. Furthermore, these liquid systems cannot be cooled to low temperatures to reduce thermal noise, since the liquids would freeze. (iv) Solid state systems can be used, including quantum dots, Josephson junctions, and nuclear spins of implanted phosphorous ions in silicon. However, these solid state systems would require technical breakthroughs before they could be scaled up to large numbers of distinct qubits.

There is a need, therefore, for a quantum computer that does not require cumbersome experimental techniques, that can be cooled to low temperatures, and that can be scaled to large numbers of qubits.

A solid state crystal can be considered for quantum computation, wherein qubits are represented by spins of individual atoms or nuclei. However, it is not obvious how to distinguish between adjacent spins in the crystal, since the spins are so close together (on the order of 10 angstroms). Furthermore, spurious couplings among the atoms of the crystal will contaminate the quantum computation.

OBJECTS AND ADVANTAGES

It is therefore a primary object of the present invention to provide a crystal lattice quantum computer wherein quantum bits are represented by nuclear spins, and adjacent spins can be distinguished. It is a further object of the present invention to cancel the spurious couplings within the crystal to reduce the error rate of the quantum computer.

The quantum computer of the present invention has the advantages that it has a relatively simple design, it can be cooled to low temperatures, and can be scaled up to include a large number of quantum bits.

Furthermore, the nuclear spins that store the quantum bits have a long relaxation time and are isolated from their surrounding environment. The nuclei are regularly spaced in the crystal lattice, allowing them to be precisely addressed. The nuclei have spin-1/2, and have no isotopes with different nuclear spins. Finally, the nuclei are surrounded by localized electrons, allowing a magnetic order of the electrons to be utilized to initialize the nuclear spins efficiently.

SUMMARY

A quantum computer comprises a crystal lattice having storage atoms. The storage atoms have nuclear storage spins. Quantum bits are stored as orientations of the storage spins. A magnetic field is applied to the crystal, the magnetic field having a gradient strong enough to cause energy levels of adjacent storage atoms along the direction of the gradient to be significantly different. The gradient is preferably created by a micromagnet in the vicinity of the crystal. The micromagnet preferably has a width on the order of 1 $\mu$m or less and generates a gradient on the order of 1 $\mu$m. The micromagnet preferably comprises dysprosium.

The electrons of the crystal acquire a regular order. This order is utilized to initialize the storage spins as follows: combined electron-nucleus transitions are induced in the crystal, resulting in the transfer of the electronic order to the polarizations of the storage spins.

The storage spins are decoupled from each other by applying a time-varying decoupling magnetic field. The decoupling field eliminates spurious couplings that otherwise plague the crystal. The decoupling field rotates the storage spins in such a way as to cancel their magnetic dipole-dipole interactions. The decoupling field preferably comprises series of $\pi/2$-pulses.

Quantum logic operations are performed on the storage spins. In a one-bit gate, a storage spin is rotated by an angle $\theta$. A two-bit exclusive-OR gate involves the interaction of two storage spins. To carry out the exclusive-OR operation, the two storage spins must be recoupled by either modifying or switching off the decoupling field. The exclusive-OR operation is then achieved by applying an oscillating magnetic field to the crystal, wherein the oscillating magnetic field has a frequency equal to a resonance frequency of the recoupled storage spins.

Measurement of final polarizations of the storage spins is achieved by applying an oscillating measurement magnetic field to the crystal and measuring an amount of absorption of the measurement field. In the preferred embodiment, the crystal comprises measurement atoms, and the measurement field has a frequency equal to a resonant frequency of a coupled system comprising at least one measurement atom and at least one storage atom.

DETAILED DESCRIPTION

I. Crystal

Figure 1:
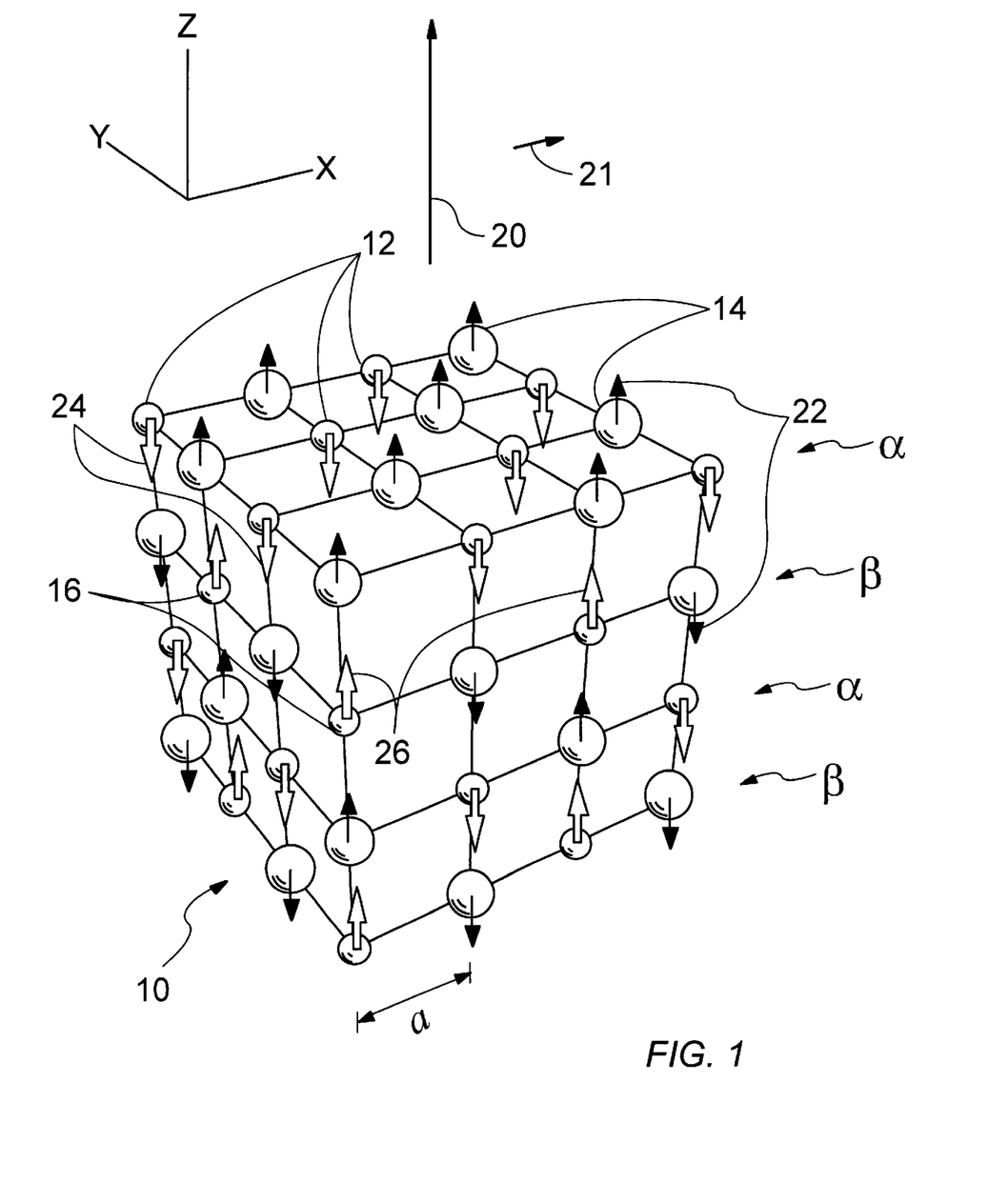
FIG. 1 shows a crystal used in a quantum computer.

FIG. 1 shows a crystal 10 used in a quantum computer of the present invention. Crystal 10 comprises spectator atoms 14 and active atoms having non-zero nuclear spins. The active atoms comprise storage atoms 12. In the preferred embodiment, the active atoms also comprise measurement atoms 16. Measurement atoms 16 are preferably identical to storage atoms 12; the measurement atoms are distinguished from the storage atoms by their locations. This distinction is further discussed below.

For the purposes of illustration, only a few atoms appear in FIG. 1. However, crystal 10 in general comprises any number of atoms, such as one hundred million or more.

The atoms of crystal 10 preferably form a regular lattice. The nuclei of storage atoms 12 have storage spins 24, and the nuclei of measurement atoms 16 have measurement spins 26. Quantum bits, or qubits, are stored by storage spins 24. In the preferred embodiment, storage spins 24 are spin-1/2, and storage atoms 12 do not have isotopes with other nuclear spins. Only five elements, $^{19}F$, $^{31}P$, $^{89}Y$, $^{103}Rh$, and $^{169}Tm$, satisfy these requirements. Therefore, in the preferred embodiment, storage atoms 12 and measurement atoms 16 are all either fluorine, phosphorus, yttrium, rhodium, or thulium.

In the preferred embodiment, storage atoms 12 and measurement atoms 16 form a salt structure with spectator atoms 14. It is known that rare-earth elements form compounds known as "rare-earth salts" with group VA elements, including phosphorous. In the embodiments where the measurement atoms is phosphorous, it is preferred that the spectator atoms are atoms of a rare-earth element. Among the rare-earth elements, cerium is the simplest, since a cerium atom has zero nuclear spin (all other rare-earth elements have nonzero nuclear spins).

Therefore, in the preferred embodiment, storage atoms 12 and measurement atoms 16 are phosphorous, and spectator atoms 14 are cerium. In a cerium monophosphide crystal, each cerium atom has only one unpaired 4f electron. Crystals of cerium monophosphide, or CeP, are now obtainable using recently developed crystal growth techniques; see Y. S. Kwon et al., Physica B 171 (1991) p. 324 and Y. Haga et al., Physica B 206 & 207 (1995) p. 792.

Cartesian x, y, and z axes are oriented as shown in FIG. 1, preferably with each of the axes normal to a face of crystal 10. The z-axis points in a longitudinal direction, and the x- and y-axes point in lateral directions perpendicular to the longitudinal direction.

A static magnetic field 20 is applied to crystal 10. The static magnetic field has a component in the z-direction. The crystal is preferably kept at a temperature below the Nél temperature, approximately 8.5 K for CeP. In the preferred embodiment, when static magnetic field 20 is applied, a magnetic order is created among the electrons of spectator atoms 14.

In the preferred embodiment, the spectator atoms are cerium atoms, and each cerium atom has a single unpaired 4f electron. The electron belongs to a $^2F$ multiplet, which is split by the spin-orbit interaction to produce a $^2F_{7/2}$ and a $^2F_{5/2}$ multiplet, see FIG. 2. The $^2F_{7/2}$ and $^2F_{5/2}$ multiplets have an energy difference of approximately 280 meV, large enough that the higher energy $^1F_{7/2}$ levels can be ignored.

Figure 2:
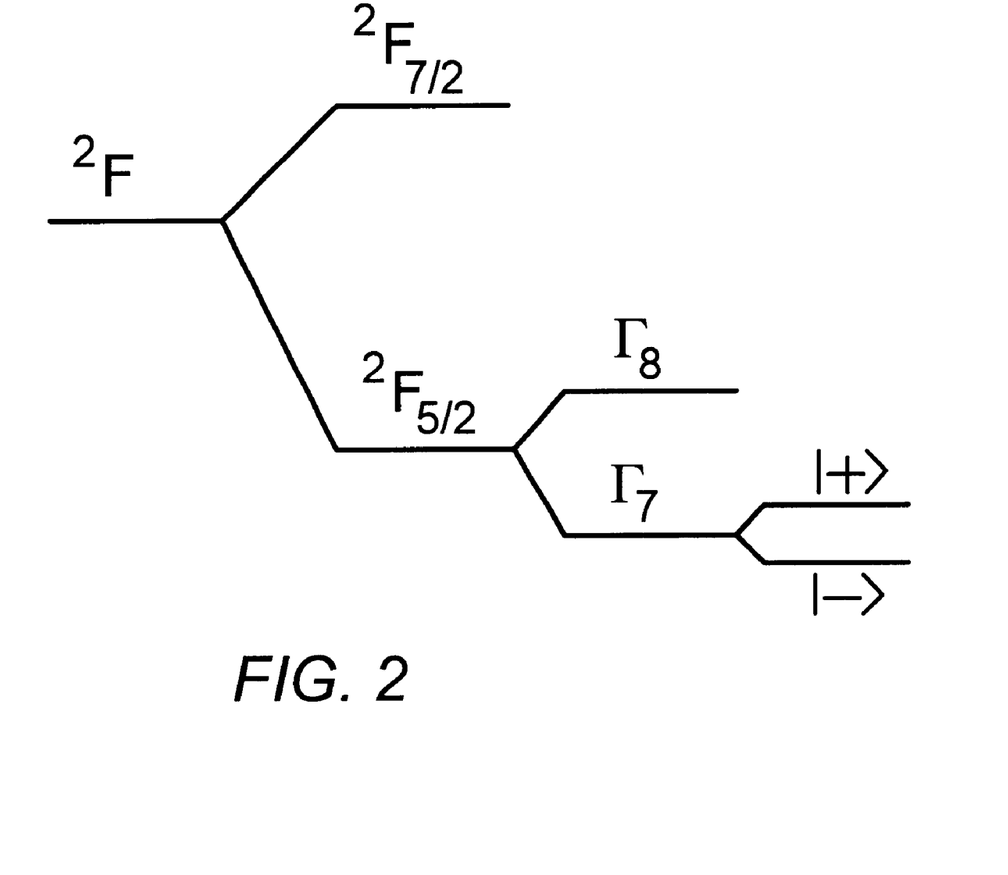
FIG. 2 is an energy level diagram for electrons in the crystal.

A crystalline field present within crystal 10 splits the $^2F_{5/2}$ manifold into a $\Gamma_8$ quartet and a $\Gamma_7$ doublet, as shown in FIG. 2. The energy difference between the $\Gamma_8$ and $\Gamma_7$ multiplets is approximately 15 meV, an energy corresponding to a temperature of 170 K. Because crystal 10 is kept at a low temperature (preferably less than 8.5 K), the $\Gamma_8$ quartet can be ignored.

Therefore each cerium atom of crystal 10 possesses an electron in the $\Gamma_7$ doublet, the eigenstates of which are written $|+\rangle$ and $|-\rangle$. The eigenstates $|+\rangle$ and $|-\rangle$ can be regarded as the eigenstates of an effective spin operator. Therefore each cerium atom has an effective spin 22, as shown in FIG. 1. Each of the effective spins is "up" or "down" (illustrated by a solid arrow pointing up or down in FIG. 1) depending on whether the corresponding electron is in the $|+\rangle$ state or the $|-\rangle$ state, respectively.

To reduce thermal excitations and thereby improve signal to noise in the quantum computer, crystal 10 is preferably kept at a temperature below 2 K. Typically, crystal 10 has a temperature of 1 K.

When static magnetic field 20 has a magnitude on the order of 1 T or less, effective spins 22 of the cerium atoms align in alternate α and β layers, as shown in FIG. 1. The layers are parallel to the xy-plane. In each α layer, the effective spins are up, and in each β layer, the effective spins are down.

When static magnetic field 20 is applied, the nuclear spins of the active atoms (that is, storage spins 24 and measurement spins 26) couple to static magnetic field 20 via the Zeeman effect. The nuclear spins also couple to the effective spins of the neighboring electrons via the hyperfine interaction.

Static magnetic field 20 has a magnitude in the z-direction equal to $B_z(x,y)$. When $B_z(x,y)<1$ T, the effective spins acquire the anti-ferromagnetic order illustrated in FIG. 1, and the nuclear spins of the active atoms are described by two different Hamiltonians, one for the a layers and one for the β layers.

In each α layer, the storage spin 24 located at position (x,y) has a z-component $I^\alpha_z$ and an energy given by the following Hamiltonian:

$$H_\alpha = (g_I \mu_N B_z(x,y) - A_{hf}^{iso} - 4A_{hf})I^\alpha_z \quad (1)$$

The first term in Eq. (1) gives the Zeeman splitting, the second gives the hyperfine splitting. The storage spin z-component $I^\alpha_z$ can take on values of +1/2 (up nuclear spin) or -1/2 (down nuclear spin). The constant $g_I$ is the g-factor for the active atoms; in the preferred embodiment the active atoms are phosphorous and $g_I=1.13$. The quantity $\mu_N$ is the nuclear magneton. The quantity $A_{hf}^{iso}$ is the magnitude of an isotropic coupling, and has an experimentally determined value of approximately 4 MHz. The quantity $A_{hf}$ determines the strength of the hyperfine interaction, and is given by:

$$A_{hf} = -(\mu_0/4\pi)g_I \mu_N g \mu_B/a^3$$

In this expression $\mu_0$ is the permeability of free space; g-factor for the effective spins and is equal to $-10/7$; $\mu_B$ is the Bohr magneton; and a is a lattice spacing of crystal 10, as shown in FIG. 1.

In each β layer, the measurement spin 26 located at position (x,y) has a z-component $I^\beta_z$ and an energy given by:

$$H_\beta = -(g_I \mu_N B_z(x,y) + A_{hf}^{iso} + 4A_{hf})I^\beta_z \quad (2)$$

Eqs. (1) and (2) are similar, except for the signs in front of $4A_{hf}$ and $A_{hf}^{iso}$, corresponding to opposite orientations of neighboring effective spins.

In the preferred embodiment, the active atoms in the a layers are storage atoms 12, and the active atoms in the α layers are measurement atoms 16. More generally, it is preferred that the storage atoms are a collection of atoms that have identical hyperfine energies.

In a second embodiment, the active atoms in the a layers are the measurement atoms, and the active atoms in the β layers are the storage atoms. In a third embodiment, all of the active atoms are storage atoms, used for the storage and manipulation of quantum bits, regardless of their hyperfine energies. In this third embodiment, there are no measurement atoms.

When the strength of static magnetic field 20 is larger than 1 T, the effective spins 22 in crystal 10 align themselves in a manner more complicated than the alternating sequence of FIG. 1. For example, the effective spins may form several spin-up layers in a row, followed by a number of alternating spin-up and spin-down layers. In the case of this and other complex magnetic order, it is still preferred that the storage atoms all have the same hyperfine energies.

Although it is presently preferred that crystal 10 comprises CeP, other compositions of crystal 10 are possible. In one embodiment, crystal 10 comprises $CaF_2$. This choice is advantageous because most calcium atoms have no nuclear spin, and only a small percentage—0.13%—have spin 7/2. In another embodiment, crystal 10 comprises $MnF_2$. The $MnF_2$ crystal establishes an anti-ferromagnetically ordered spin structure that has been well studied. In yet another embodiment, crystal 10 comprises $CeF_3$. In these three embodiments, the storage atoms are fluorine atoms. For more information on materials to be used for crystal 10, see Thaddeus Ladd et al., "Decoherence in Candidate Materials for Crystal Lattice Quantum Computation," to be published in Applied Physics A. More information on CeP can be found in F. Yamaguchi et al., "Crystal Lattice Quantum Computer," Applied Physics A 68 (1999) 1–8.

II. Static Magnetic Field

Static magnetic field 20 points primarily in the z-direction. Static magnetic field 20 furthermore has a gradient 21 in the x-direction, as illustrated in FIG. 1. Gradient 21 gives storage atoms 12 different nuclear magnetic resonance frequencies, each resonance frequency depending upon the x-coordinate of the associated storage atom.

In some embodiments, gradient 21 has a component in the x-direction but not in the y-direction. In these embodiments, $B_z(x,y)$ is a function only of x, and is approximately uniform in planes parallel to the yz-plane within crystal 10. In other embodiments, the gradient 21 has components both the x-direction and in the y-direction. In these embodiments, $B_z(x,y)$ is a function of both x and y.

In general, gradient 21 points in any direction, including the z-direction. In the presently preferred embodiments, gradient 21 lies in the xy-plane, and the present discussion assumes that gradient 21 is perpendicular to the z-axis. This assumption, however, should not be construed as a limitation of the invention.

Figure 3A:
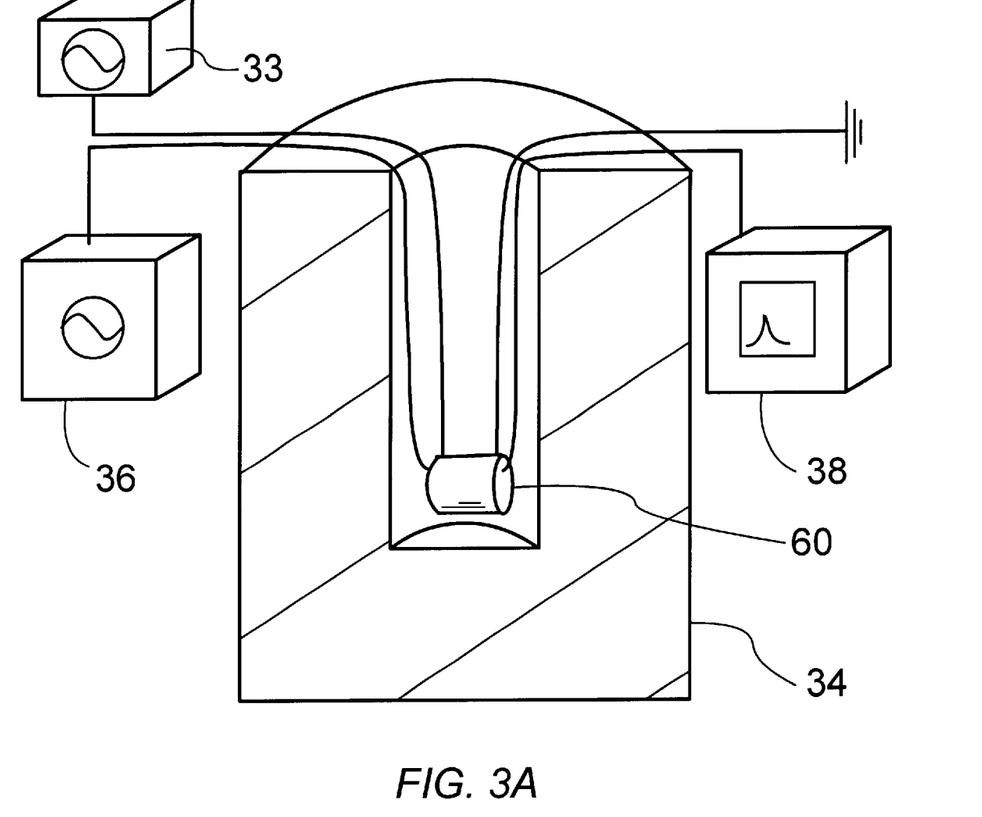
FIG. 3A illustrates the quantum computer according to a preferred embodiment of the invention.

FIG. 3A illustrates a cutaway view of the quantum computer according to the preferred embodiment of the invention. A background magnetic field is generated by a magnet 34. Magnet 34 is preferably a superconducting magnet. A first coil 60 resides within magnet 34. First coil 60 is connected to a first power supply 33.

Figure 3B:
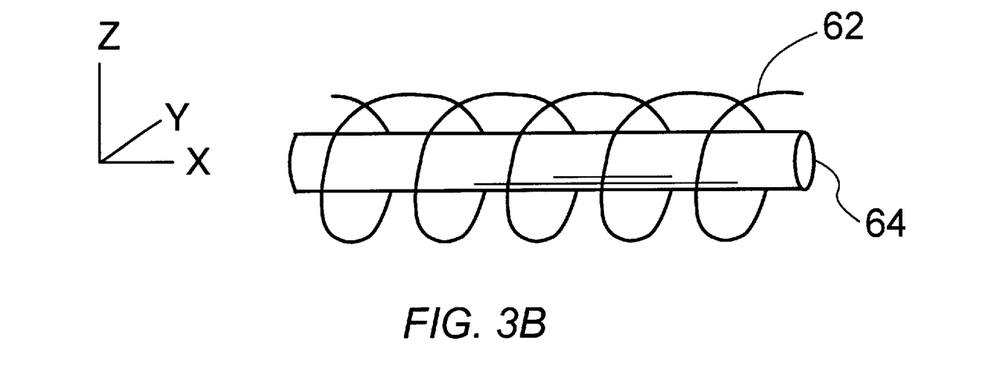
FIG. 3B shows a sample holder and a coil enclosing the crystal.

Within first coil 60 is a second coil 62 which in turn encloses a sample holder 64, as shown in FIG. 3B. Second coil 62 is electrically connected to a second power supply 36 and to a signal processor 38. The first and second coils provide time-varying magnetic fields to crystal 10, as explained in detail below.

Figure 3C:
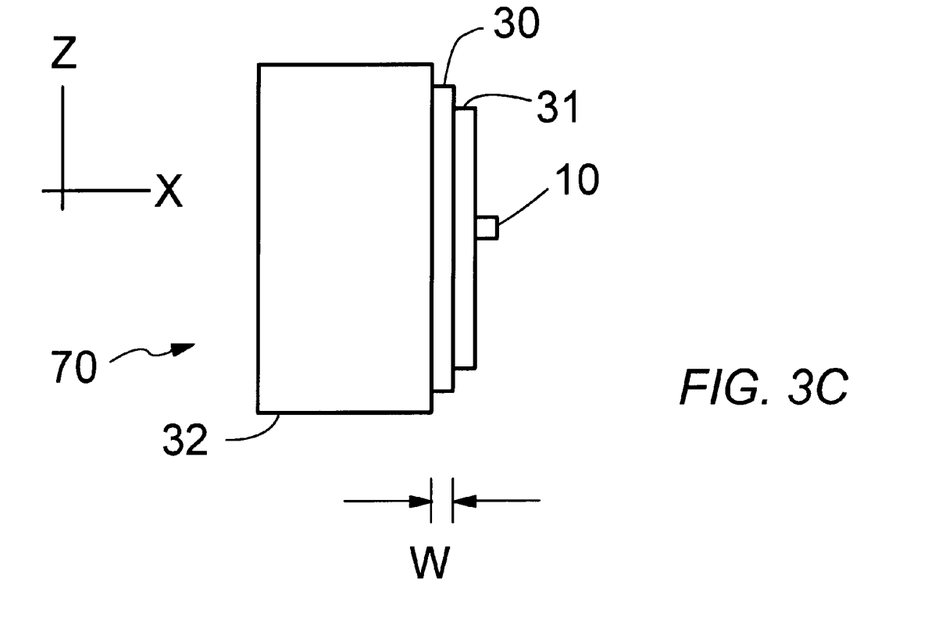
FIG. 3C shows an assembly comprising the crystal.

Inside sample holder 64 is an assembly 70, as shown in FIG. 3C. Assembly 70 comprises a micromagnet 30 attached to a substrate 32. Micromagnet 30 has a coating 31, to which is attached crystal 10.

Micromagnet 30 is preferably ferromagnetic, and establishes a spatially varying magnetic field, thereby providing gradient 21. Magnetic field 20 is the sum of the magnetic field due to micromagnet 30 and the background field created by magnet 34.

Gradient 21 is preferably on the order of or greater than 1 T/$\mu$m. This magnitude gives a difference in $B_z(x,y)$ of roughly $10^{-3}$T between two adjacent storage atoms separated by 2a (approximately 12 angstroms). This difference corresponds to a Zeeman frequency difference of 8 kHz.

For gradient 21 to have a value of 1 T/$\mu$m or greater, micromagnet 30 must have a width w that is extremely small. In the preferred embodiment, width w is on the order of or less than 1 $\mu$m. In some embodiments, width w is even smaller, taking on values on the order of 0.1 $\mu$m or even 0.01 $\mu$m.

To fabricate micromagnet 30 with the desired width, micromachining and deposition techniques are used. In the preferred embodiment, micromagnet 30 comprises dysprosium. In another embodiment, micromagnet 30 comprises cobalt. Coating 31 optimizes gradient 21 within crystal 10 by giving a spacing between micromagnet 30 and crystal 10. Coating 31 is preferably on the order of 1 $\mu$m thick. Coating 31 preferably comprises a polyamide.

Assembly 70 causes gradient 21 to point in the x-direction. In another embodiment, assembly 70 comprises two side-by-side micromagnets in a "split gate" configuration. This configuration causes magnetic field 20 to vary in both the x- and y-directions. In alternate embodiments, gradient 21 is established by one or more current-carrying electrodes. More information on micromagnet 30 can be found in J. R. Goldman et al., "Magnet Designs for a Crystal Lattice Quantum Computer," to be published in Applied Physics A.

III. Initialization

The qubits of the quantum computer are initialized by giving storage spins 24 initial polarizations. The initialization takes advantage of the Pound-Overhauser double resonance on the anti-ferromagnetically ordered effective spins and the nuclear spins. Storage spins 24 and measurement spins 26 are initialized by inducing combined electron-nucleus transitions in crystal 10.

A total magnetic field in the α layers, $B^\alpha_{tot}(x,y)$ is the sum of static magnetic field 20 and an exchange magnetic field $B_{exch}$ generated by the neighboring effective spins:

$$B^\alpha_{tot}(x,y)=B_z(x,y)+B_{exch}. \quad (3)$$

Because of the anti-ferromagnetic structure of crystal 10, the α layers experience an exchange magnetic field in the opposite direction to that found in the α layers. Therefore a total magnetic field in the β layers $B^\beta_{tot}(x,y)$ is:

$$B^\beta_{tot}(x,y)=B_z(x,y)-B_{exch}. \quad (4)$$

The magnitude of $B_{exch}$ is on the order of 10T.

As shown in FIG. 1, a storage spin at position (x,y,z) is surrounded by six effective spins 22, four of which are in the same xy-plane and two of which are located above and below the storage spin at locations (x,y,z±a). Transition energies for the effective spins in the α layers is significantly different from transition energies for the effective spins in the β layers, primarily due to the different exchange magnetic fields, as given in Eqs. (3) and (4). Therefore, in considering the coupling of the storage spin at (x,y,z) to the effective spins in the P layers, the effective spins in the a layers can be ignored.

Figure 4:
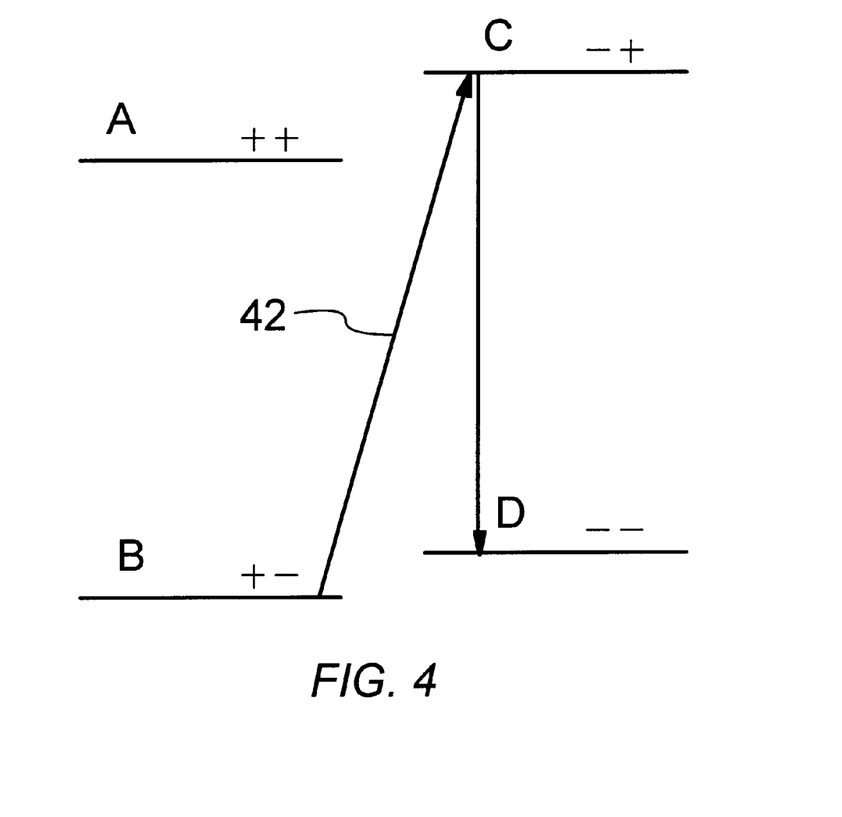
FIG. 4 is an energy level diagram for a combined nucleus-electron system of the crystal.

FIG. 4 shows an energy level diagram for the storage spin at position (x,y,z) and the effective spin immediately above the storage spin. The storage spin has z-component $I^\alpha_z$, and the effective spin has z-component $S^\beta_z$. In a state A, both $I^\alpha_z$ and $S^\beta_z$ equal+1/2; that is, both spins are up. In a state B, $(I^\alpha_z,S^\beta_z)=(+1/2,-1/2)$. States C and D are characterized by $(I^\alpha_z,S^\beta_z)=(-1/2,+1/2)$ and $(I^\alpha_z,S^\beta_z)=(-1/2,-1/2)$, respectively.

Transitions between states A and B, or between states C and D, are electron transitions. A combined electron-nucleus spin-flip transition 42 exists between states B and C. A transition between states A and D is not allowed.

At low temperatures, states B and D have roughly equal probabilities of being populated, and states A and C are unpopulated. To initialize the storage spin at (x,y,z), an oscillating magnetic field $B_t$ having a frequency (i) is applied to crystal 10, wherein frequency $\omega_1$ has a value necessary to induce combined electron-nucleus transition 42 from state B to state C. When the transition is induced, state C decays quickly to state D, leaving $I^\alpha_z$ in the down state.

Frequency $\omega_1$ is given by:

$$\omega_1 = [|g|\mu_B(B_{exch} - B_z(x,y)) + g_I\mu_N B_z(x,y) - (3/2) A_{hf}^{iso} - 3A_{hf}]\hbar. \quad (5)$$

In the above analysis, only the effective spin immediately above the storage spin at (x,y,z) was considered. An analysis of the coupling to the effective spin immediately below (x,y,z) shows that the oscillating magnetic field of frequency $\omega_1$ can induce a combined electron-nucleus transition involving the effective spin below (x,y,z), again resulting in the storage spin being polarized in the down state.

Because frequency $\omega_1$ depends upon $B_z(x,y)$, frequency $\omega_1$ in general depends upon x and y. A plurality of oscillating magnetic fields having frequencies tuned according to the (x,y) locations of the storage atoms are applied. The oscillating magnetic fields cause the storage atoms and spectator atoms undergo combined electron-nucleus transitions that place substantially all of the storage spins into the down state.

Similarly, the measurement atoms at (x,y) are polarized by applying an oscillating magnetic field $B_{t2}$ having frequency $\omega_2$, wherein $$\omega_2 = [|g|\mu_B(B_{exch} + B_z(x,y)) - g_I\mu_N B_z(x,y) - (3/2)A_{hf}^{iso} - 3 A_{hf}]\hbar. \quad (6)$$

The result of applying $B_{t2}$ is to polarize the measurement atoms at (x,y) in the up state. Oscillating magnetic fields $B_t$ and $B_{t2}$ are generated by first coil 60 in FIG. 3A.

In general, the storage spins are given initial directions, or polarizations, by inducing combined electron-nucleus transitions in crystal 10. This is true even when the electronic structure is different from the anti-ferromagnetic structure of the effective spins illustrated in FIG. 1. In some embodiments, the combined electron-nucleus transitions occur at optical frequencies.

IV. Decoupling

Storage spins 24 are grouped into collections, wherein all of the storage spins in a given computation collection experience the same magnetic field $B_z(x,y)$. That is, magnetic field 20 has the same strength at each storage spin 24 in a given collection.

For example, when gradient 21 lies in the x-direction, the storage atoms in each collection lie in a plane parallel to the yz-plane. When Bz(x,y) depends on both x and y, then each collection comprises storage atoms that lie in a line parallel to the z-axis.

A time-varying decoupling magnetic field is applied to crystal 10 to decouple the storage spins from each other. The purpose of the decoupling field is twofold. First, the decoupling field eliminates interactions between storage spins within the same collection. This allows the storage spins within each collection to act independently, and results in multiple parallel quantum calculations that do not interfere with each other.

The second purpose of the decoupling field is to decouple the different collections from each other. That is, the decoupling field also decouples storage spins having different locations along the direction of gradient 21. This prevents the qubits represented by the storage spins in different collections from interfering with each other. When a quantum logic operation is to be performed on more than one collection, the relevant collections are recoupled during the operation. Quantum logic operations are further discussed below.

For the purposes of illustration, three storage spins are considered, and gradient 21 is parallel to the x-axis. A first storage spin $I_1$ is the nuclear spin of the storage atom at coordinates $(x_1, y_1, z_1)$. A second storage spin $I_2$ is the nuclear spin of a storage atom at coordinates $(x_1+2a, y_1, z_1)$. A third storage spin $I_1'$ is the nuclear spin of a storage atom at coordinates $(x_1, y_1, z_1+2a)$. In this illustration, spins $I_1$ and $I_1'$ belong to the same collection; spins $I_1$ and $I_2$ belong to different collections.

Figure 5A:
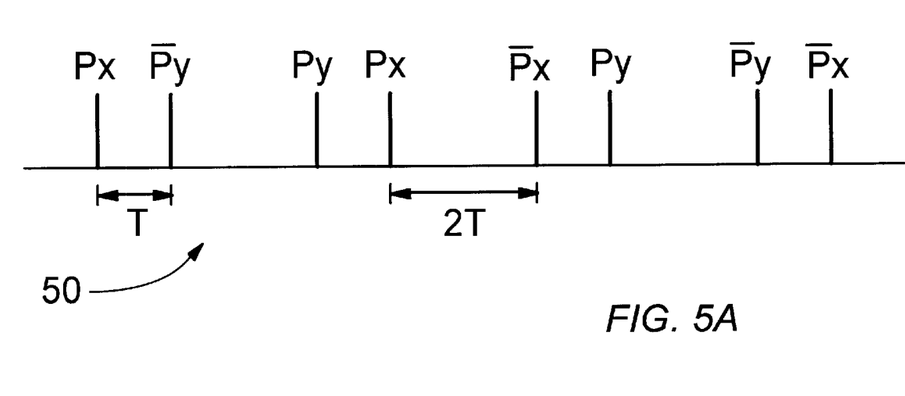
FIGS. 5A and 5B illustrate pulse sequences used in a decoupling magnetic field.
Figure 5B:
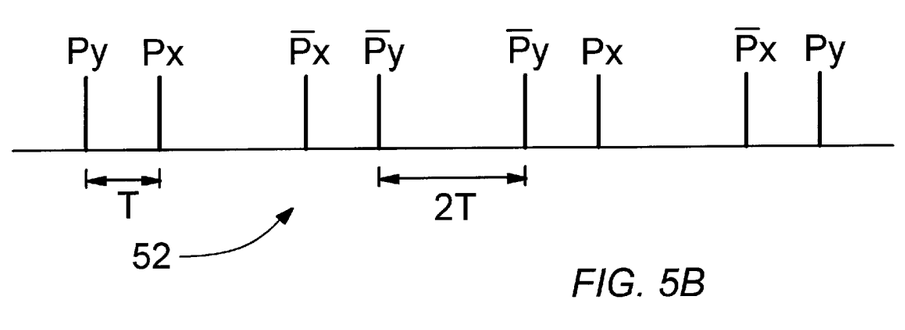

In the preferred embodiment, the decoupling magnetic field comprises a first series of pulses 50 and a second series of pulses 52, as shown in FIGS. 5A and 5B. $P_x$ and $P_y$ are $\pi/2$ pulses about the x- and y-axes, respectively. $\overrightarrow{P}_x$ and $\overrightarrow{P}_y$ are $\pi/2$ pulses about the negative x- and negative y-axes, respectively. A time interval T characterizes the timing of the pulses. The pulses separated by T or by 2T, as shown in FIG. 5A. T is typically on the order of 10 $\mu$sec.

First series 50 comprises $\pi/2$ pulses adjusted to operate on all storage spins having the same x-coordinate as $I_1$. By applying the first series to crystal 10, spins $I_1$ and $_1'$ are decoupled. This decoupling can be demonstrated by noting that the interaction Hamiltonian between spins $I_1$ and $I_1'$ is proportional to $3 I_{1z}I_{1'z} - I_1 \cdot I_1'$, the average of which is zero under the influence of the first series.

Second series 52 is shown in FIG. 5B. The second series is a series of $\pi/2$ pulses, the duration and frequency of which have been adjusted to operate on storage spins having x-coordinate equal to $x_1 + 2a$. The interaction Hamiltonian between $I_1$ and $I_2$ is proportional to $I^{1z} I_{2z}$. Under the influence of series 50 and series 52, the average interaction between $I_1$ and $I_2$ is zero. Therefore the decoupling field comprising the first and second series decouples the storage spins $I_1$, $I_1'$, and $I_2$. In the preferred embodiment, crystal 10 comprises measurement atoms 16, and the decoupling magnetic field also comprises components that decouple the measurement atoms from the storage atoms and from each other.

Figure 5C:
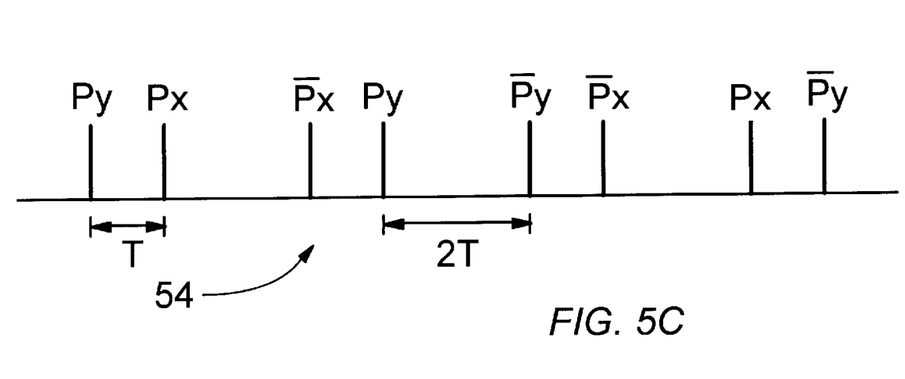
FIG. 5C illustrates a pulse sequence used in a recoupling magnetic field.

If it is desired to carry out a quantum logic operation on storage spins $I_1$ and $I_2$, the spins are recoupled. This recoupling is accomplished by applying a recoupling magnetic field to crystal 10. The recoupling field comprises first series 50 and a third series of pulses 56, illustrated in FIG. 5C. The recoupling field maintains the decoupling of spins $I_1$ and $I_1'$ within the same collection, but couples the spin $I_1$ with the adjacent spin $I_2$.

Other decoupling and recoupling schemes are used in other embodiments of the invention. In one alternate embodiment, the decoupling magnetic field comprises a sequence of $\pi$-pulses to spin $I_1$, flipping the spin back and forth rapidly enough that it has no time-averaged effect on spin $I_2$.

In another alternate embodiment, the decoupling magnetic field comprises a sequence of two alternating magnetic fields parallel to the x-axis, each applied for a time $T_1$. The first alternating field rotates the storage spins located at (x,y) by an angle $\theta_1(x,y)$. The second alternating field differs from the first by a phase of $\pi$, and rotates the storage spins at (x,y) back to their original positions. Because static magnetic field 20 varies with x, angle $\theta_1(x,y)$ varies with x, and the average interaction between $I_1$ and $I_2$ is zero. In the alternate embodiments above, the spins $I_1$ and $_2$ are recoupled by temporarily switching off the decoupling magnetic field.

V. Quantum Logic Operations

All quantum logic operations on an arbitrarily large number of qubits can be built up from one-bit gates and two-bit exclusive-OR gates. These operations can be performed as follows.

(a) One-Bit Gate

An $i^{th}$ storage spin $I_i$ is rotated by an angle θ. To accomplish this rotation, an alternating magnetic field $B_q$ is applied along the x-axis for a time duration τ given by: $(q_1 \mu_N B_q)\tau = \theta$. The magnetic field $B_q$ has a frequency $\omega_q$ chosen to satisfy the resonance condition determined by Eq. (1).

(b) Exclusive-OR Gate

A two-bit exclusive-OR operation is performed on $i^{th}$ storage spin $I_i$ and an adjacent storage spin $I_{i+1}$, located a distance $2a$ along the x-axis from storage spin $I_i$. The exclusive-OR operation flips spin $I_1$ only when $I_{i+1}$ has a predetermined value, or flips $I_{i+1}$ only when $I_i$ has a predetermined value.

The z-components of the storage spins $I_i$ and $I_{i+1}$ are $m_i$ and $m_{i+1}$, respectively. Neglecting interactions with other storage spins, the energy of storage spin $I_i$ is: $E_i = \hbar \omega_i m_i$, where $\omega_i$ can be calculated from Eq. (1). Storage spins $I_i$ and $I_{i+1}$ are recoupled, either by using the recoupling field as outlined above, or by shutting off the components of the decoupling field that decouple spins $I_i$ and $I_{i+1}$. The storage spins then form a coupled system with energy levels given by:

$$E = \hbar \omega_i m_i + \hbar \omega_{i+1} m_{i+1} + A_{nd}^1 m_i m_{i+1} \quad (7)$$

In Eq. (7), the term $A_{nd}^1$ gives a nuclear dipole interaction between storage spins $I_i$ and $_{i+1}$. In the preferred embodiment, where crystal 10 comprises CeP, $A_{nd}^1$ can be calculated from $A_{nd}^1 = (\mu_0/4\pi)(g_I\mu_N)^2/(2a)^3$, and has a value of 120 Hz.

Figure 6:
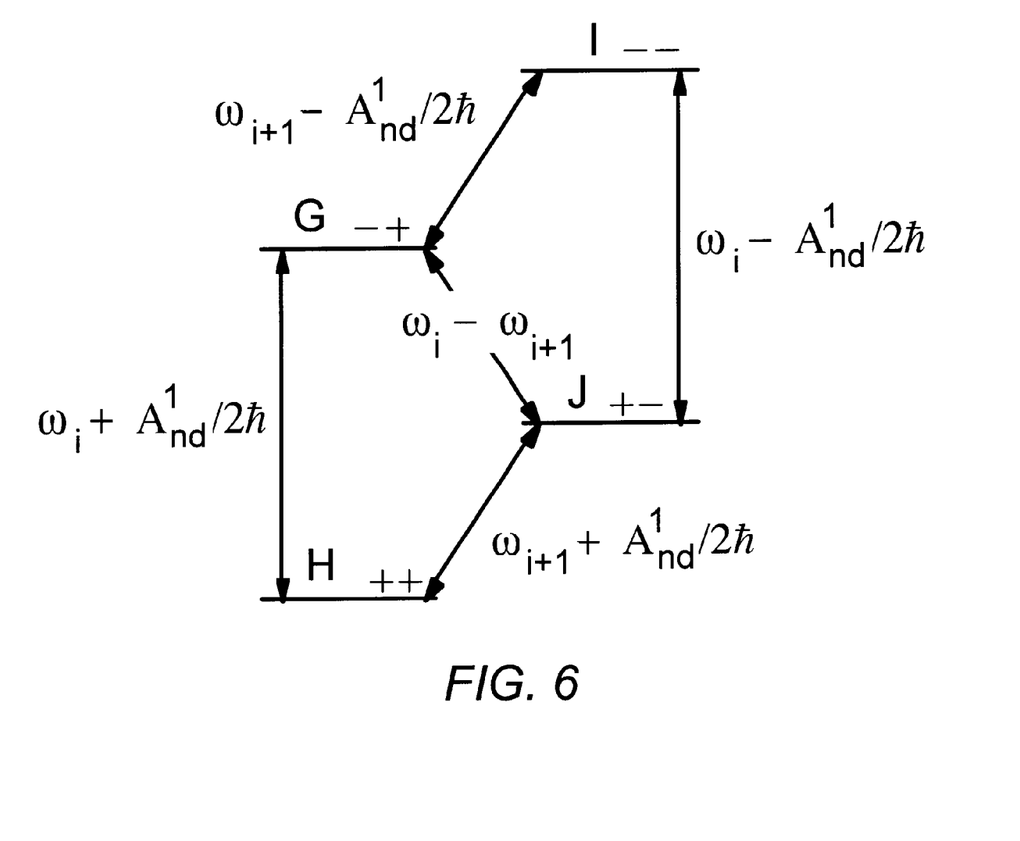
FIG. 6 is an energy level diagram of a coupled system of two storage spins belonging to the crystal.

The coupled system described by Eq. (7) is illustrated in FIG. 6. States G, H, I, and J correspond to $(m_i, m_{i+1}) = (-1/2, +1/2), (+1/2, +1/2), (-1/2, -1/2),$ and $(+1/2, -1/2)$, respectively. The energies of the states can be computed from Eq. (7). The corresponding resonant frequencies for transitions of the coupled system are given in FIG. 6.

To operate the exclusive-OR gate, an oscillating magnetic field $B_o$ is applied for a length of time suitable to provide a π-pulse. $B_o$ has a frequency equal to one of the resonant frequencies for a single spin-flip transition in the system of FIG. 6.

For example, when a π-pulse at frequency $\omega_i + A_{nd}^1/2\hbar$ is applied, spin $I_i$ flips only when $m_{i+1} = +1/2$. A π-pulse at frequency $\omega_i - A_{nd}^1 2\hbar$ flips spin $I_i$ only when $m_{i+1} = -1/2$. Similarly, π-pulses at frequencies $\omega_{i+1}; \pm A_{nd}^1 2\hbar$ conditionally flip $I_{i+1}$.

(c) Other operations

Other quantum logic operations are possible. Two qubits can be swapped as follows. In the coupled system of $I_i$ and $I_{i+1}$ represented in FIG. 6, a π-pulse is applied at frequency $\omega_i - \omega_{i+1}$. After this pulse is applied, $m_i$ is equal to the value that $m_{i+1}$ had before the pulse; similarly $m_{i+1}$ is equal to the prior value of $m_i$.

Another quantum logic operation is a three-bit exclusive-OR gate. Storage spins $I_{i-1}, I_i,$ and $I_{i+1}$ are three consecutive storage spins that lie in a line parallel to the x-axis. The three storage spins $U_{i-1}, I_i,$ and $I_{i+1}$ are coupled together to form a three-spin system. The three-spin system has energies:

$$E = \hbar \omega_{i-1} m_{i-1} + \hbar \omega_i m_i + \hbar \omega_{i+1} m_{i+1} + A_{nd}^1 m_{i-1} m_i + A_{nd}^1 m_i m_{i+1},$$

neglecting the dipole coupling between $I_{i-1}$ and $I_{i+1}$. A π-pulse at a frequency $\omega_i + A_{nd}^1\hbar$ flips storage spin $I_i$ only when $m_{i-1} = m_{i+1} = 1/2$. π-pulses at frequencies $\omega_{i-1} + A_{nd}^1/2\hbar$ and $\omega_{i+1} + A_{nd}^1 2\hbar$ flip spins $I_{i-1}$ and $I_{i+1}$, respectively, only when $m_i = 1/2$.

When a quantum logic operation operates on storage spin $I_i$ having coordinates $(x_i, y_i, z_i)$, the quantum logic operation generally acts on all of the storage spins experiencing the same strength of magnetic field 20. Therefore in general, quantum logic operations do not operate only on single storage spins, but on the collections of spins. Because the collections of atoms undergo quantum logic operations, and the atoms in each collection are decoupled, the quantum computer performs the same computation many times simultaneously.

VI. Measurement

The storage spins are first initialized. Then quantum logic operations are performed on the storage spins. As a final step in the process of quantum computation, final z-components, or polarizations, of the storage spins are measured. The measurement can be carried out in at least two ways.

Method 1: Nuclear Magnetic Resonance

The measurement atoms are preferably decoupled from the storage atoms by the decoupling magnetic field. To measure the final polarization of storage spin $I^\alpha(x,yz)$ of the storage atom at $(x,y,z)$, storage spin $I^\alpha(x,y,z)$ is coupled to measurement spin $I^\beta(x+a,y,z+a)$. Because of the uniformity of magnetic field 20 in the z-direction, measurement spin $I^\beta(x+a,y,z+a)$ is thereby also coupled to storage spin $I^\alpha(x,y,z+2a)$.

The three spins $I^\alpha(x,y,z)$, $I^\beta(x+a,y,z+a)$, and $I^\alpha(x,y,z+2a)$ form a coupled measurement system. To make a measurement, an oscillating magnetic measurement field $B_m$ is applied to crystal 10, the frequency of $B_m$ being equal to one of the resonant frequencies of the measurement system.

The Hamiltonian describing the interactions of the measurement system is:

$$H = -[g_1\mu_N B_z(x+a,y) + A_{hf}^{iso} + 4A_{hf}]I^\beta_z(x+a,y,z+a) - (1/2)A_{nd}^0[I^\alpha_z(x,y,z) + I^\alpha_z(x,y,z+2a)]I^\beta_z(x+a,y,z+a) \quad (8)$$

Here $A_{nd}^0$ gives the nuclear dipole interactions between the measurement nuclei and the storage nuclei. $A_{nd}^0 = 2^{3/2} A_{nd}^1$, approximately 340 Hz for CeP. When measurement field $B_m$ has a frequency $[g_1\mu_N B_z(x+a,y) + 4A_{hf} + A_{hf}^{iso} + A_{nd}^0]\hbar$ and is absorbed, the result of the measurement is that $I^\alpha_z(x,y,z) = I^\alpha_z(x,y,z+2a) = 1/2$. Similarly, when measurement field $B_m$ has a frequency $[g_1\mu_N B_z(x+a,y) + 4A_{hf} + A_{hf}^{iso} - A_{nd}^0]\hbar$, and is absorbed, the final polarizations of the storage atoms were $I^\alpha_z(x,y,z) = I^\alpha_z(x,y,z+2a) = -1/2$. Therefore the coupling of the measurement atoms with the storage atoms affords a measurement of the z-components of the storage spins.

To carry out the measurement, measurement field $B_m$ is generated by second coil 62, as shown in FIG. 3B. Second coil 62 is connected to signal processor 38, which determines the amount of power lost to crystal 10 by second coil 62. That is, signal processor 38 determines the amount of absorption (if any) of measurement field $B_m$ by crystal 10. From the absorption measurement, the final polarizations of the storage spins determined.

Method 2: Electron Spin Resonance

The second method does not use the measurement atoms. This method uses the fact that the electron resonance of an electron at $(x,y,z+a)$ with effective spin $S^\beta$ occurs at a frequency $[|g|\mu_B(B_{exch} - B_z(x,y)) + A_{hf}^{iso}/2 - A_{hf}]\hbar$ if $I^\alpha_z(x,y,z) = 1/2$, and at a frequency $[|g \oplus \mu_B(B_{exch} - B_z(x,y)) - A_{hf}^{iso}/2 + A_{hf}]\hbar$ if $I^\alpha_z(x,y,z) = +1/2$. It is therefore possible to again measure the absorption of measurement field $B_m$ having one of the above frequencies to determine the value of $I^\alpha_z(x,y,z)$.

VII. Further Considerations

In the quantum computer of FIGS. 3A–3C, various time-varying magnetic fields are generated. In the presently preferred embodiment, the oscillating magnetic field Bt that initializes the storage spins is generated by first coil 60. The decoupling magnetic field, the oscillating magnetic fields $B_q$ and $B_o$ that perform quantum logic operations, as well as the Although the above description contains many specificities, these should not be construed as limiting the scope of the invention but as merely providing illustrations of some of the presently preferred embodiments of this invention. Thus the scope of the invention should be determined by the following claims and their legal equivalents.

We claim:

1. A method of preparing a crystal for a nuclear magnetic device, wherein said crystal comprises a plurality of storage atoms, the nucleus of each of said storage atoms having a storage spin, said method comprising the following steps:
   a) applying a static magnetic field to said crystal, wherein said static magnetic field has a component along a longitudinal direction, and said static magnetic field has a gradient;
   b) giving said storage spins initial polarizations by inducing combined nucleus-electron transitions in said crystal; and
   c) applying a time-varying decoupling magnetic field to said crystal, thereby decoupling said storage spins from each other.

2. The method of claim 1, further comprising the step of applying a magnetic field at a resonant frequency of a first of said storage spins.

3. The method of claim 1, further comprising the step of performing a quantum logic operation comprises the following steps:
   a) recoupling a first storage spin with a second of said storage spins, thereby creating a coupled system comprising said first and second storage spins; and
   b) applying an oscillating magnetic field perpendicular to said magnetic field to said crystal, said oscillating magnetic field having a frequency equal to a resonant frequency of said storage atoms.

4. The method of claim 1, wherein said crystal further comprises a plurality of measurement atoms, wherein the nucleus of each of said measurement atoms has a measurement spin; and wherein said method further comprises the following step:
   applying an oscillating magnetic field perpendicular to said magnetic field to said crystal, said oscillating magnetic field having a frequency equal to a resonant frequency of said storage atoms comprising at least one of said storage spins and a first of said measurement spins.

5. The method of claim 3, wherein said quantum logic operation operates on a collection of said storage spins, wherein said static magnetic field has the same strength at each of said storage spins in said collection.

6. The method of claim 1, wherein said gradient is greater than 1 T/$\mu$m.

7. The method of claim 1, wherein said crystal has a temperature of less than 2 K.

8. The method of claim 1, wherein said storage spins are spin-1/2.

9. The method of claim 8, wherein said storage atoms are selected from the group consisting of: fluorine, phosphorus, yttrium, rhodium, and thulium.

10. The method of claim 9, wherein said crystal comprises cerium monophosphide.

11. A nuclear magnetic device utilizing a crystal comprising:
   a) said crystal comprising a plurality of storage atoms, wherein the nucleus of each of said storage atoms has a storage spin, and wherein said storage atoms are selected from the group consisting of: fluorine, phosphorous, yttrium, rhodium, and thulium;
   b) a means for generating a static magnetic field, wherein said static magnetic field has a component along a longitudinal direction, and said static magnetic field has a gradient;
   c) a means for inducing combined electron-nucleus transitions in said crystal, for giving said storage spins initial polarizations; and
   d) a means for generating a time-varying decoupling magnetic field, for decoupling said storage spins from each other.

12. The device of claim 11, further comprising a means for applying a magnetic field at a resonant frequency of a first of said storage spins.

13. The device of claim 11, further comprising a means for applying an oscillating magnetic field perpendicular to said magnetic field, wherein said oscillating magnetic field has a frequency equal to a resonant frequency of said storage atoms comprising said first storage spin and a second storage spin.

14. The device of claim 13, wherein said crystal further comprises measurement atoms, wherein the nucleus of each of said measurement atoms has a measurement spin; and wherein said device further comprises a means for applying an alternating measurement magnetic field to said crystal, wherein said alternating measurement magnetic field has a frequency equal to a resonant frequency of said storage atoms comprising at least one of said storage spins and a first of said measurement spins.

15. The device of claim 11, further comprising a means for generating an oscillating magnetic field for producing a quantum logic operation, wherein said quantum logic operation operates on collection of said storage spins, wherein said static magnetic field has the same strength at each of said storage spins in said collection.

16. The device of claim 11, wherein said means for generating said static magnetic field comprises a micromagnet having a width of less than 1 $\mu$m.

17. The device of claim 16, wherein said micromagnet comprises a material selected from the group consisting of: dysprosium and cobalt.

18. The device of claim 17, wherein said crystal comprises cerium monophosphide.

19. The device of claim 11, wherein said crystal has a temperature of less than 2 K.

* * * * *